United States Patent [19]

Gazda

[11] 4,152,533

[45] May 1, 1979

[54] ELECTRODE JOINT

[75] Inventor: Irving W. Gazda, Grand Island, N.Y.

[73] Assignee: Great Lakes Carbon Corporation, New York, N.Y.

[21] Appl. No.: 900,717

[22] Filed: Apr. 27, 1978

[51] Int. Cl.² ............................................. H05B 7/14
[52] U.S. Cl. ................................ 13/18 C; 403/DIG. 5
[58] Field of Search ........................... 13/18 R, 18 C; 403/DIG. 5, 296

[56] References Cited

U.S. PATENT DOCUMENTS 2,957,716  10/1960  Kaufmann et al. ............ 403/DIG. 5

FOREIGN PATENT DOCUMENTS 2555688  12/1975  Fed. Rep. of Germany ............. 13/18

Primary Examiner—R. N. Envall, Jr.
Attorney, Agent, or Firm—R. Laddie Taylor

[57] ABSTRACT

The threads at the ends of a nipple for joining two electrode sections are chamfered, or chamfering is incorporated on the threads at the base of the electrode sockets, to provide increased flexural strength and thermal shock resistance for an electrode joint formed therefrom.

9 Claims, 14 Drawing Figures

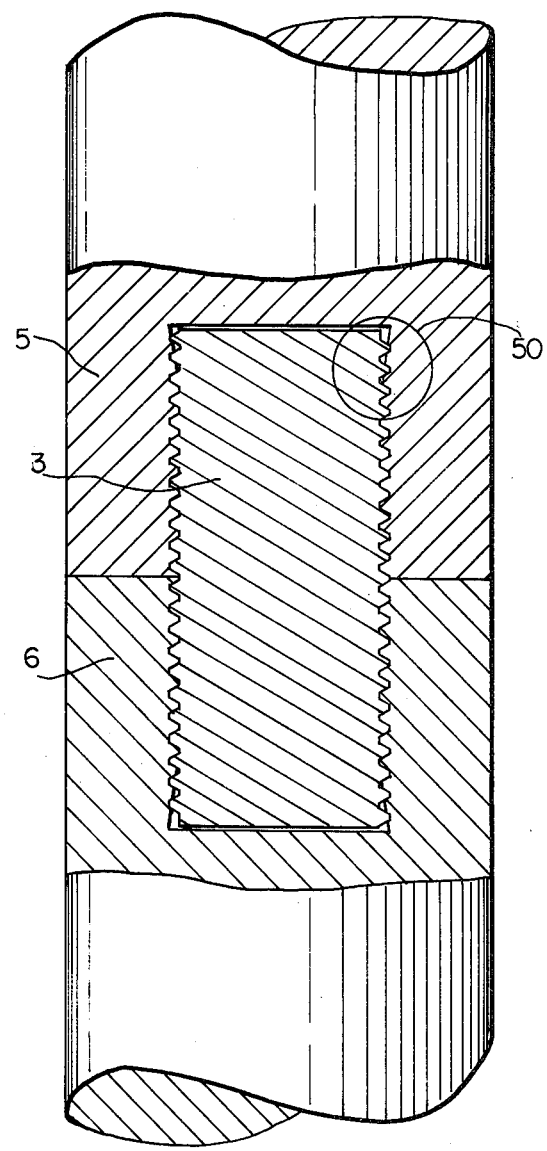
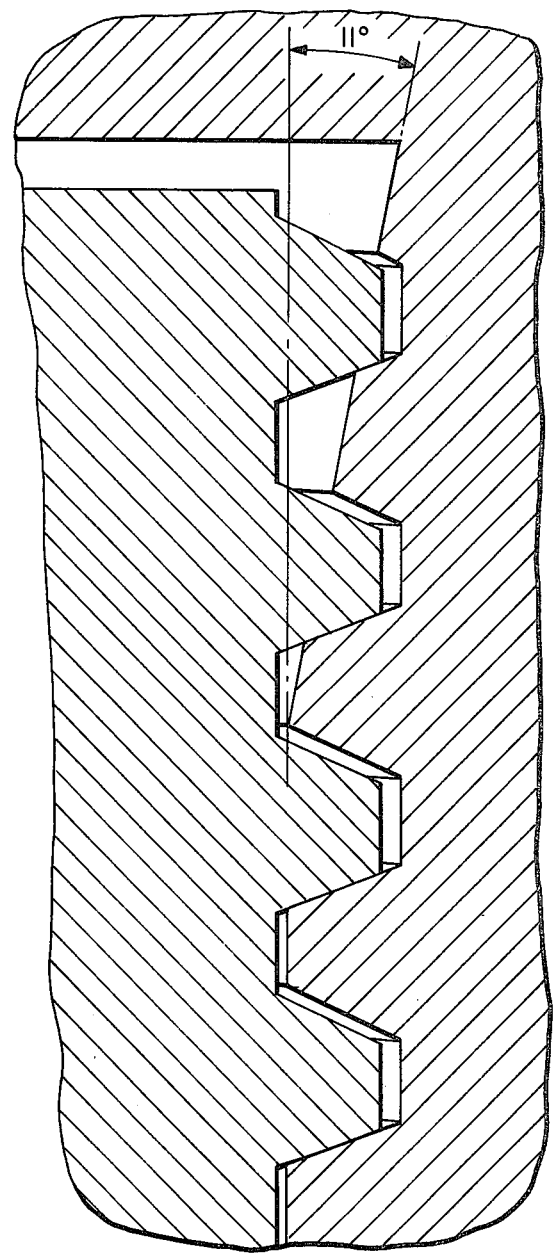
FIG. 5
FIG. 6

ELECTRODE JOINT

BACKGROUND OF THE INVENTION

1. Field of the Invention

This invention relates to improved joints for connecting carbon electrodes to provide electrode columns for use in electric furnaces or like equipment, the term "carbon" as used herein being generally inclusive of the graphite form of carbon. Such joints permit continuous electrical operation of an apparatus utilizing electrodes by providing means for attaching new electrode material to the end of an electrode column as the column is consumed.

Conventionally, an electrode joint comprises two coaxially aligned carbon electrode sections having threaded sockets in their butt faces and a correspondingly threaded nipple joining the electrode sections in abutting relationship. An alternative to this joint design comprises a "male-female" type electrode joint comprising two electrode sections, each section having a threaded nipple machined directly on one end thereof and a correspondingly threaded socket machined in the other end thereof, the sections being joined by uniting the nipple of one electrode section and the socket of another section.

One serious problem encountered with conventional electrode joints is that they are susceptible to failure during use, this failure resulting from breakage due to splits and cracks produced by stresses caused by flexural strain and thermal gradients experienced by the joint when it is being fed into an operating electric furnace. The difference between the coefficient of thermal expansion of the electrode sockets and the nipple also lead to stresses within the electrode joint. Further, the high current loading of modern electrode furnaces frequently causes additional joint stresses due to overheating of the nipple portion at the junction between the nipple and the electrode sockets.

It is known that failures of electrode joints, which result from the stresses and strains discussed above, are principally localized at the first engaged socket thread in the base of the socket or the first engaged nipple thread near midlength of the nipple for a conventional joint, and near the base of the female member in a "male-female" joint.

2. Description of the Prior Art

It has long been recognized that a modification of the conventional electrode joint design was necessary to eliminate failure due to breakage during use. Various methods have been proposed by those skilled in the art to prevent this failure by modification of the joint at or near the base of the electrode socket.

U.S. Pat. No. 3,708,601—Kozak relates to an electrode joint comprising two electrode sections having threaded sockets designed such that when joined by a nipple, all the threads at the base of the sockets are engaged with mating threads of the nipple. This reference, which provides some reduction of the stresses at the area of the electrode joint at the base of the socket by removing all threads which would not be engaged by the nipple, thereby increasing the thread root angle, does not provide means for distributing the stresses amongst the engaged threads of the joint.

The present invention provides means whereby the stresses at the first few bottom threads of an electrode socket are reduced, thus providing an electrode joint of increased strength, by chamfering the first few threads of each end of the nipple, or the first few bottom threads of each of the sockets. In the case of a "male-female" type carbon electrode joint, previously characterized, the strength of the joint can be substantially increased by chamfering the first few threads at the end of the nipple or the first few bottom threads of the socket which are united to form the electrode joint.

SUMMARY OF THE INVENTION

It is an object of this invention to provide a novel electrode joint wherein the stresses focused at the first few bottom threads of each socket are relieved, thus increasing the strength of the joint.

It is another object of this invention to provide an electrode joint which is highly resistant to breakage during use.

These and other objects of the invention are accomplished by providing a carbon electrode joint comprising two coaxially aligned carbon electrode sections, each electrode section having a threaded nipple joining the electrode sections in abutting relationship, the improvement comprising chamfering the first few threads of each end of the nipple, or the first few bottom threads of each socket, to relieve the flexural and thermal stresses thereat.

In the case of a "male-female" carbon electrode joint comprising two coaxially aligned carbon electrode sections, each section having a threaded nipple provided at one end thereof and a correspondingly threaded socket provided in the other end thereof, the nipple of one electrode section being fitted into the socket of the other electrode section, the improvement comprises chamfering the first few threads of the end of the nipple or the first few bottom threads of the socket.

With the threads altered, the forces developed during both flexural stressing and thermal stressing will be distributed over a large area, thereby decreasing the effective pressure on the socket and increasing the joint's resistance to failure.

BRIEF DESCRIPTION OF THE DRAWINGS

The invention will become more apparent when described in conjunction with the drawings, in which like reference numerals designate like parts in the several views, and wherein:

FIG. 5 is a vertical section view of a carbon electrode joint employing chamfered sockets according to the invention.

FIG. 6 is an enlarged view of Section 50 in FIG. 5.

DETAILED DESCRIPTION OF THE DRAWINGS

Figures 1, 2:
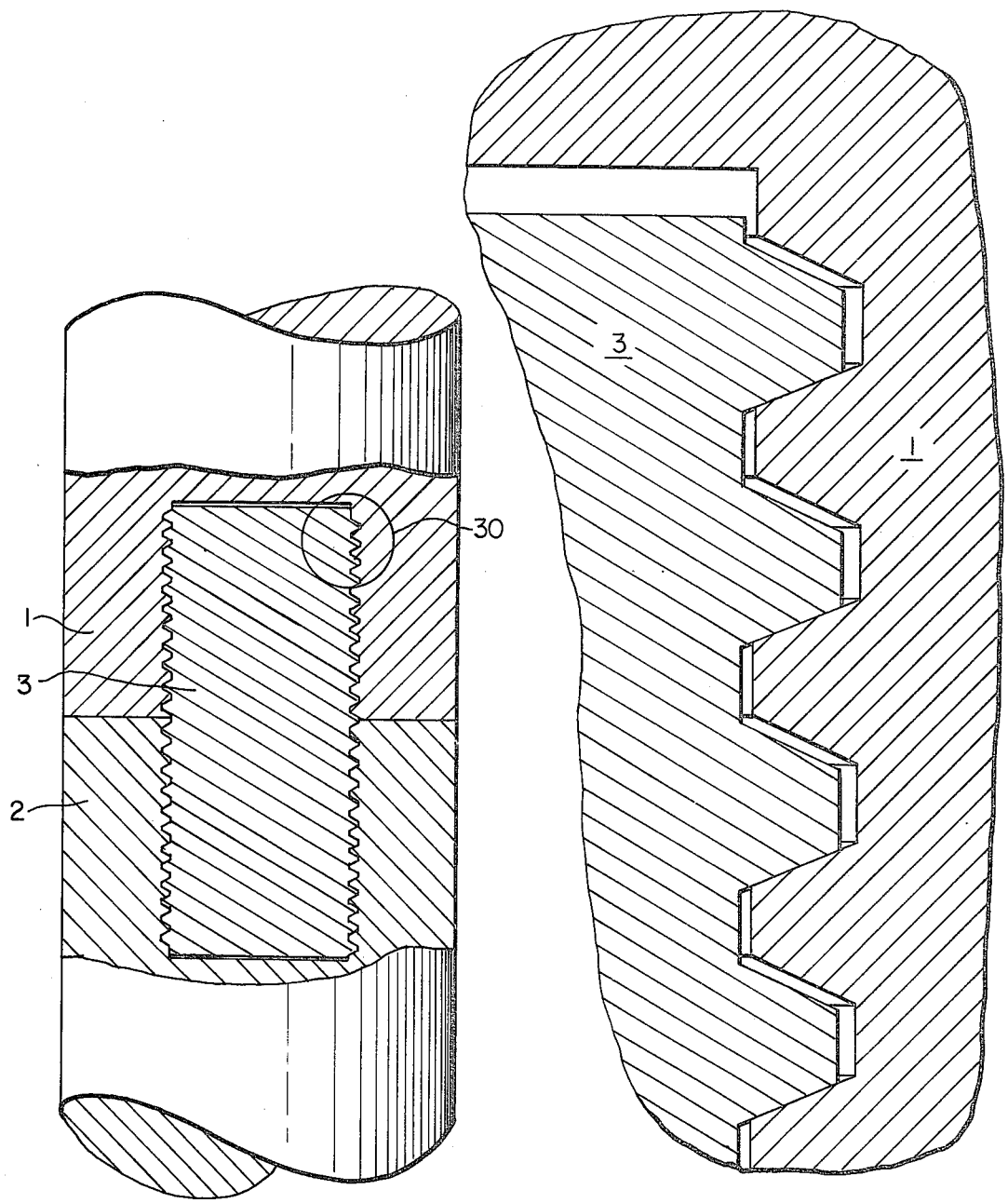
FIG. 1 is a vertical section view of a conventional carbon electrode joint (prior art).
FIG. 2 is an enlarged view of Section 30 in FIG. 1.

A conventional carbon electrode joint illustrated in FIG. 1 comprises two coaxially aligned carbon electrode sections 1 and 2, each electrode section having a threaded socket in its butt face and joined by correspondingly threaded nipple 3. When this type of electrode joint is exposed to stresses caused by flexural strain and thermal gradients resulting from high temperature environments such as operating electric furnaces, it is very susceptible to failure, the failure being localized at the first few bottom threads in the base of the electrode socket. FIG. 2 is an enlarged view of Section 30 in FIG. 1 showing the threaded area in the base of the electrode socket where failure of the joint is most likely to occur.

Figure 3:
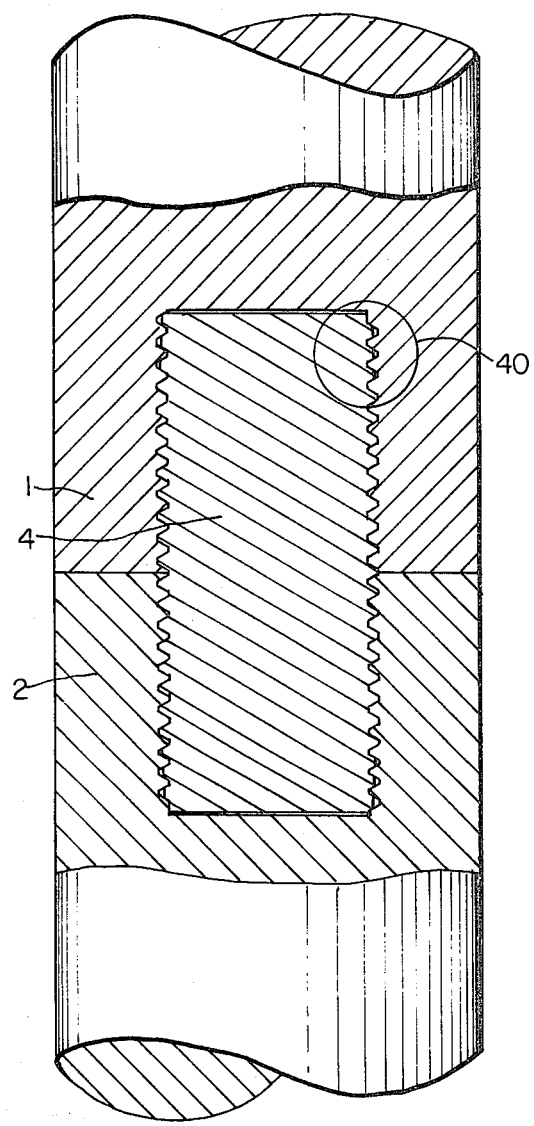
FIG. 3 is a vertical section view of a carbon electrode joint employing a chamfered nipple according to the invention.

A carbon electrode joint modified according to one embodiment of the invention is illustrated in FIG. 3 and comprises two coaxially aligned conventional carbon electrode sections 1 and 2, each electrode section having a threaded socket in its butt face, and a correspondingly threaded nipple 4 joining the electrode sections in abutting relationship, wherein the first few threads of each end of nipple 4 are chamfered at an angle to the axis of the nipple of no more than the value of $_{max}C_n$ calculated using the formula $$_{max}C_n = \phi + 11° \quad \text{(I)}$$

where $\phi$ = the angle of taper of the nipple in relation to the axis thereof. A chamfer angle of 5° is illustrated in this figure.

Figure 4:
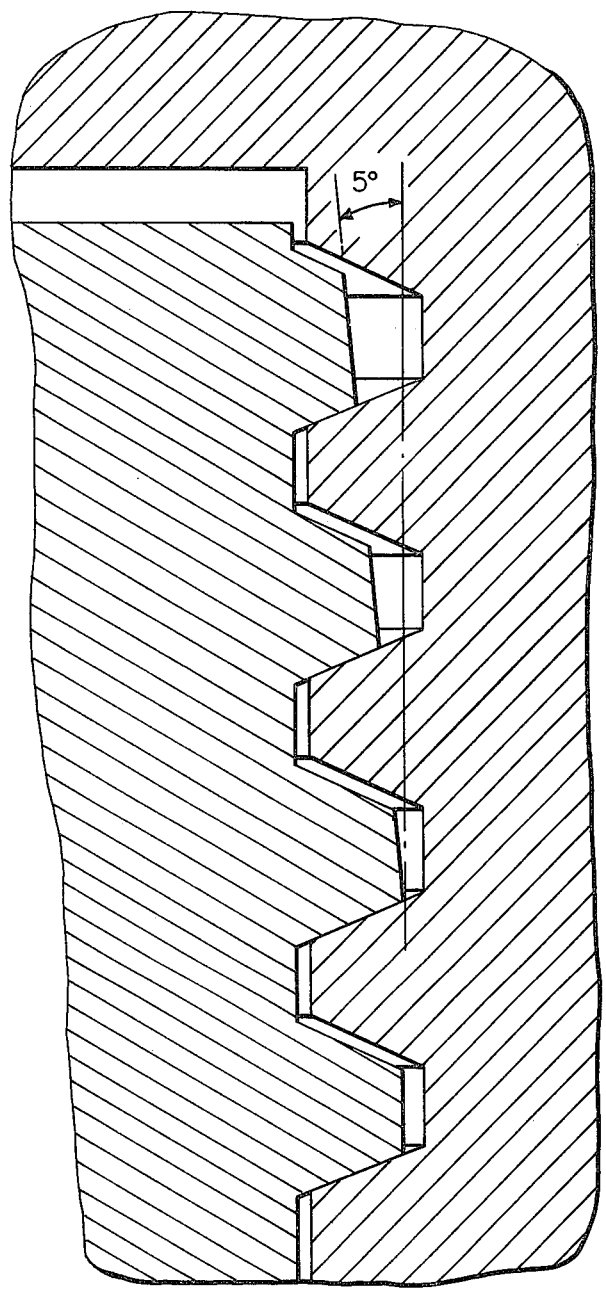
FIG. 4 is an enlarged view of Section 40 in FIG. 3.

It was determined experimentally that the maximum effective chamfer angle for nipples to provide increased joint strength can be determined using this formula. Chamfering at angles above this calculated value does not substantially increase the properties of an electrode joint containing the chamfered nipple. FIG. 4 is an enlarged view of Section 40 of FIG. 3 showing the chamfered threads of nipple 4 in detail.

Although a straight nipple is illustrated in this embodiment, it is stressed that formula (I) is valid for calculating the maximum chamfer angle for a threaded nipple used in an electrode joint wherein the threaded sockets of the electrode sections are tapered and the portions of the nipple threaded into the sockets are correspondingly tapered.

A second embodiment of the invention comprises chamfering the first few bottom threads of a conventional electrode socket to provide essentially the same effect as modification of the nipple. It has been found that the maximum effective angle of chamfering for electrode sockets, designated $_{max}C_s$, is calculated using the formula $$_{max}C_s = \theta - 11° \quad \text{(II)}$$

where $\theta$ = the angle of taper of the socket in relation to the axis thereof.

It is apparent that for a straight socket $_{max}C_s = -11°$. The relevance of the negative value of this number is discussed below.

A straight carbon electrode joint modified according to this embodiment of the invention is shown in FIG. 5 and comprises two coaxially aligned carbon electrode sections 5 and 6, each electrode section having a threaded socket in its butt face, and a correspondingly threaded nipple 3 joining the electrode sections in abutting relationship, wherein the first few bottom threads of each threaded socket are chamfered at an angle to the axis of the socket an amount calculated from formula (II) above, the maximum value of −11°. FIG. 6 is an enlarged view of Section 50 of FIG. 5 showing the chamfered threads of one of the sockets in detail.

As illustrated in FIG. 5, when the results of formula (II) produces a negative value for the chamfer angle, this indicates that the chamfering action must begin at the edge of the thread desired to be chamfered which lies the greatest distance from the base of the socket, the chamfering extending to include the bottom thread of the socket. In other words, the chamfer angle formed when a negative value is indicated is in the opposite direction, with respect to the axis of the socket, then that formed when the chamfer angle is a positive value, as illustrated for the nipple of FIG. 3.

Although straight sockets are illustrated in this embodiment, it is stressed that formula (II) is valid for calculating the maximum chamfer angle for threaded sockets used in an electrode joint wherein the threaded sockets of the electrode sections are tapered and the portions of the nipple threaded into the sockets and correspondingly tapered.

Figure 7:
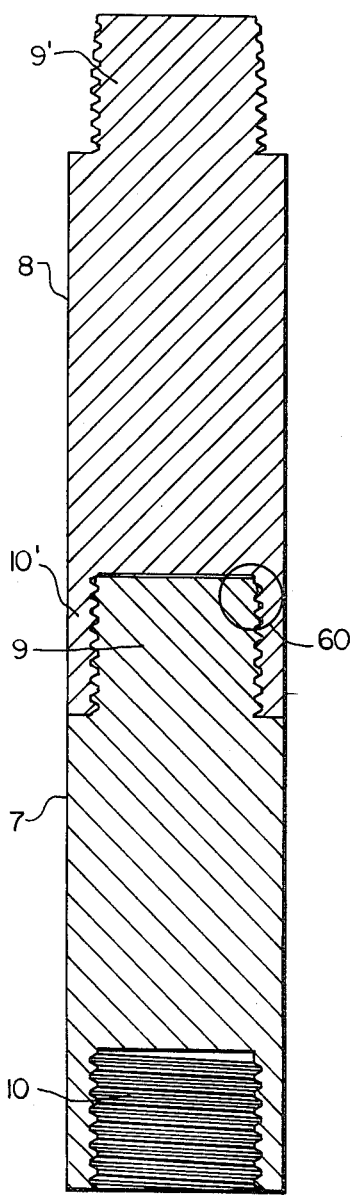
FIG. 7 is a vertical section view of a "male-female" carbon electrode joint employing a chamfered nipple according to one aspect of the invention.
Figure 8:
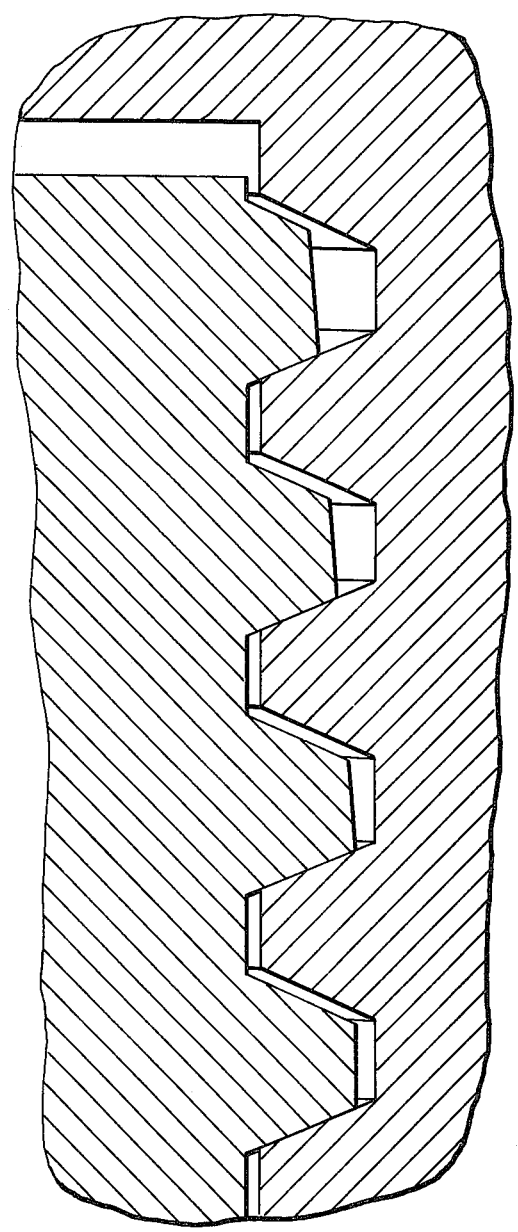
FIG. 8 is an enlarged view of Section 60 in FIG. 7.

A "male-female" carbon electrode joint modified according to one aspect of the invention is shown in FIG. 7 and comprises first and second coaxially aligned carbon electrode sections 7 and 8, each electrode section having a threaded nipple 9 and 9' respectively provided at one end thereof and a correspondingly threaded socket 10 and 10' respectively provided in the other end thereof, the nipple 9 of first electrode section 7 being fitted into the socket 10' of second electrode section 8, wherein the first few threads of the end of nipple 9 are chamfered at an angle to the axis of the nipple of no more than the value of $_{max}C_n$ calculated using formula (I) above. FIG. 8 is an enlarged view showing Section 60 in FIG. 7 in detail.

Figures 9, 10:
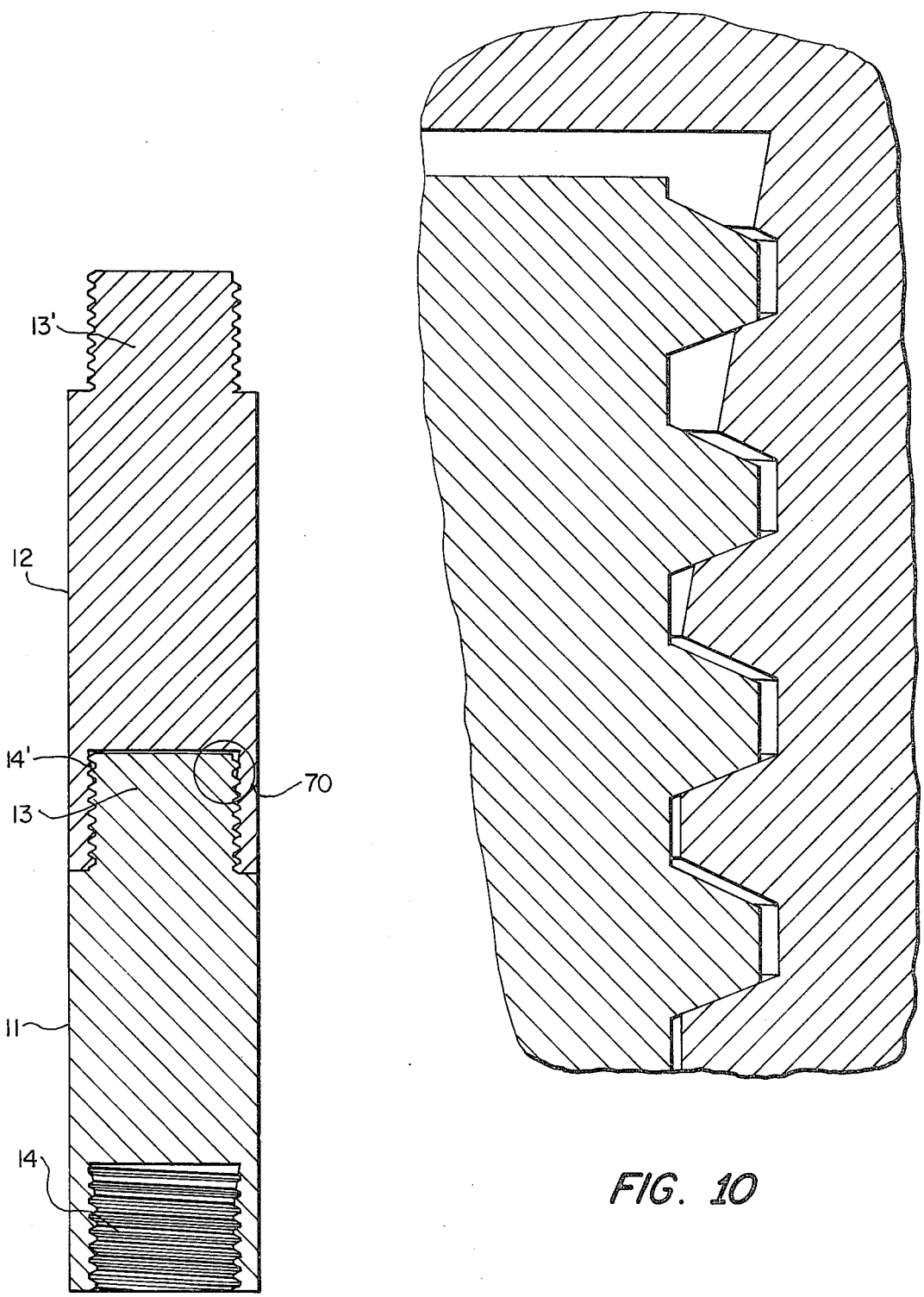
FIG. 9 is a vertical section view of a "male-female" carbon electrode joint employing a chamfered socket according to one aspect of the invention.
FIG. 10 is an enlarged view of Section 70 in FIG. 9.

FIG. 9 shows a "male-female" carbon electrode joint according to another aspect of the invention comprising first and second coaxially aligned carbon electrode sections 11 and 12, each electrode section having a threaded nipple 13 and 13' respectively provided in one end thereof and a correspondingly threaded socket 14 and 14' respectively provided in the other end thereof, nipple 13 of first electrode section 11 being fitted into socket 14' of second electrode section 12, wherein the first few threads at the bottom of socket 14' are chamfered at an angle to the axis of the socket of no more than the value of $_{max}C_x$ calculated using formula (II) above. FIG. 10 is an enlarged view showing Section 70 in FIG. 9.

The chamfered nipple or socket may be fabricated by methods known in the art, for example by lathe turning a conventional nipple or electrode section and chamfering the threads with a cutting tool, or by actually "building in" a chamfer on the insert mill cutters or hobs used to machine the threads.

DESCRIPTION OF THE PREFERRED EMBODIMENTS

Figures 11, 12:
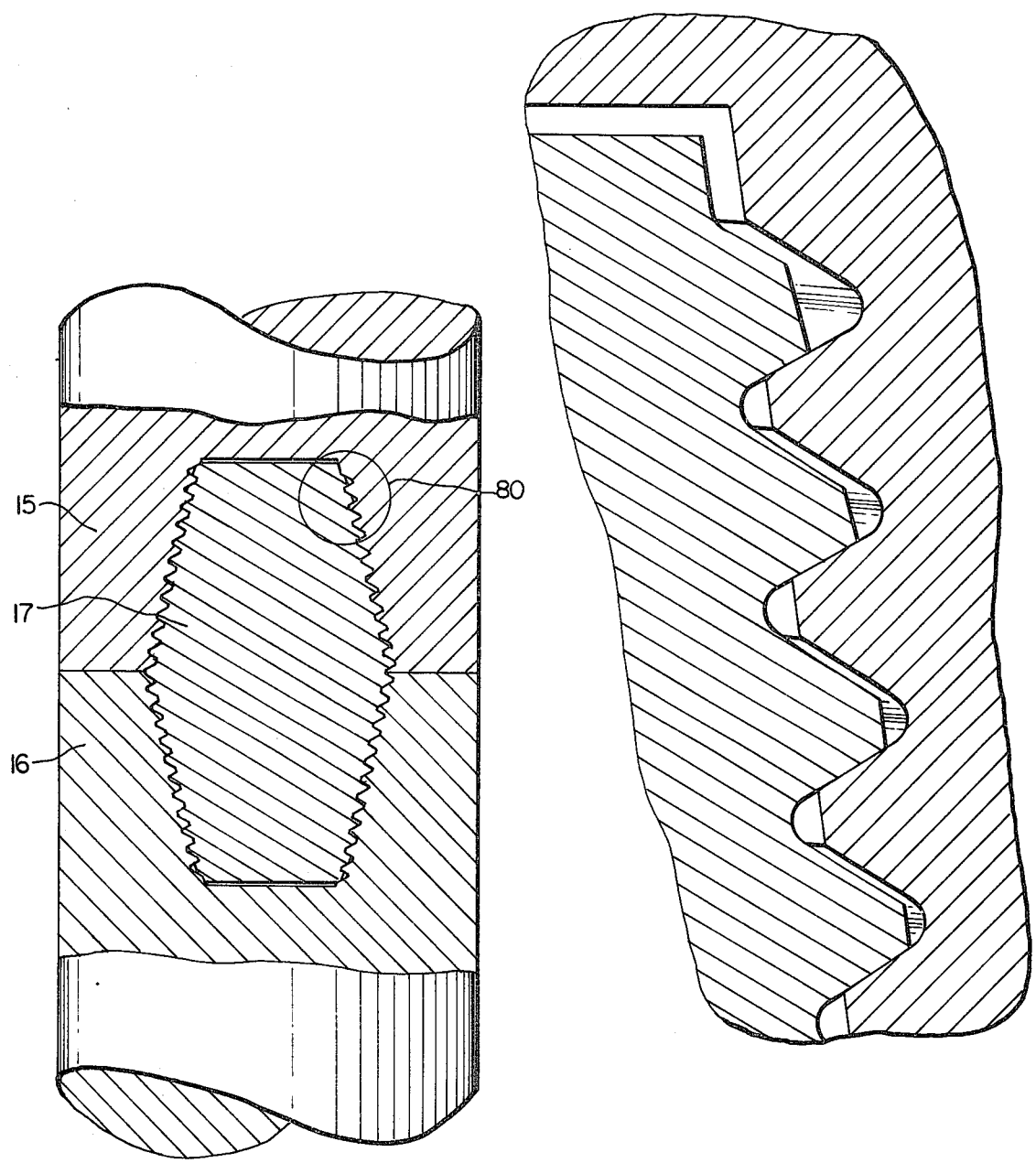
FIG. 11 is a vertical section view of a preferred embodiment of the invention showing a carbon electrode joint comprising a double tapered socket-nipple assembly employing a chamfered nipple.
FIG. 12 is an enlarged view of Section 80 in FIG. 11.

Referring now to FIG. 11, a carbon electrode joint comprises two coaxially aligned carbon electrode sections 15 and 16, each electrode section having a tapered threaded socket in its butt face, the angle of taper being 9°, and a correspondingly tapered threaded nipple 17 joining the electrode sections in abutting relationship, wherein the first two threads of each end of the nipple 17 are chamfered at an angle to the axis of the nipple the value of $_{opt}C_n$ calculated from the formula $$_{opt}C_n = \phi + 8° \quad \text{(III)}$$

where $\phi$ = the angle of taper of the nipple, in relation to the axis thereof, of 17°. It was determined experimentally that formula (III) provides the optimum angle of chamfer for the first few threads at each end of a nipple.

FIG. 12 is an enlarged view of Section 80 in FIG. 11 showing the chamfered threads of tapered nipple 17 in detail.

Figure 13:
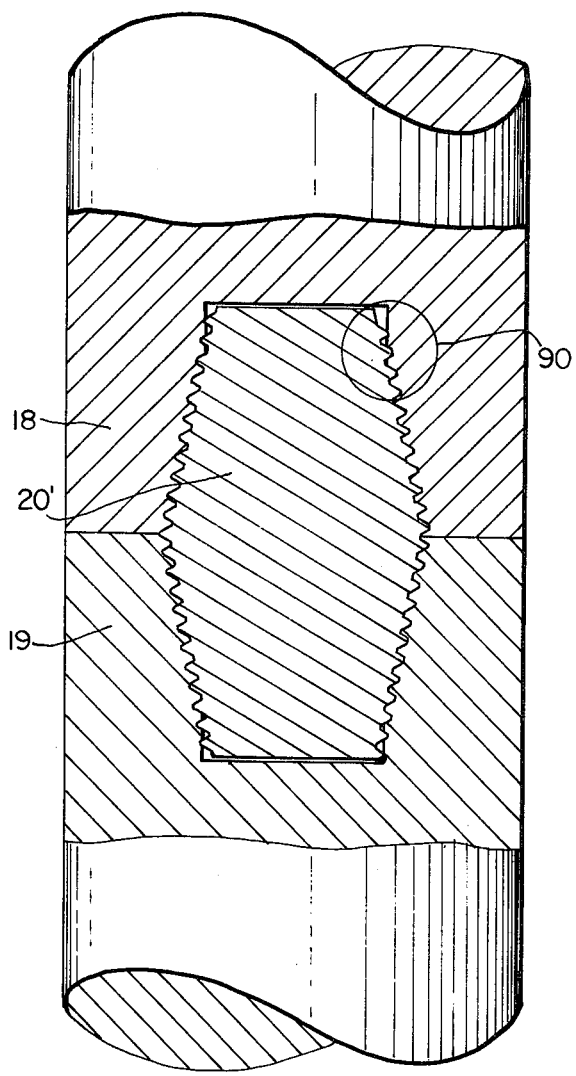
FIG. 13 is a vertical section view of a preferred embodiment of the invention showing a carbon electrode joint comprising a double tapered socket-nipple assembly employing chamfered sockets.
Figure 14:
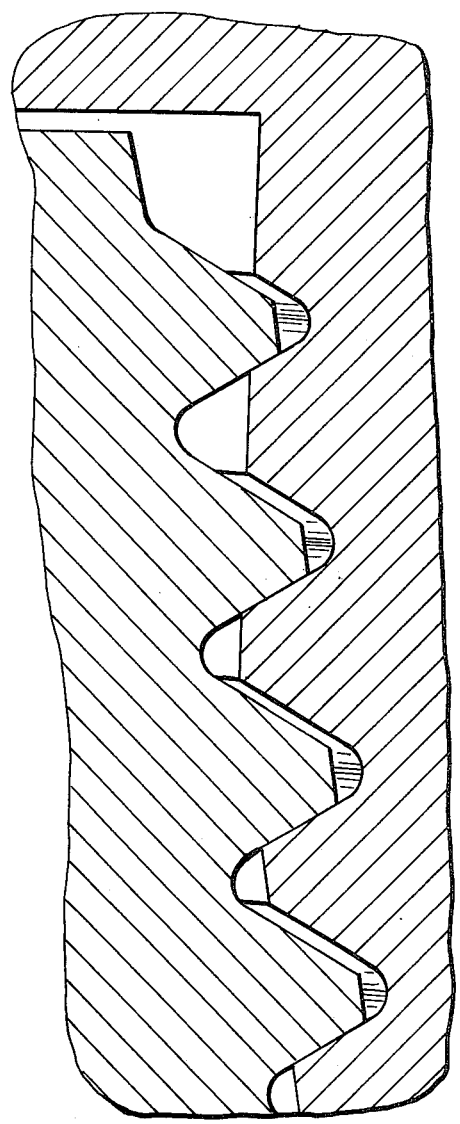
FIG. 14 is an enlarged view of Section 90 in FIG. 13.

FIG. 13 illustrates a second preferred embodiment of the invention which comprises a carbon electrode joint comprising two coaxially aligned electrode sections 18 and 19, each electrode section having a tapered threaded socket in its butt face, the angle of taper being 9°, and a correspondingly tapered threaded nipple 20 joining the electrode sections in abutting relationship, wherein the first two bottom threads of each socket are chamfered at an angle to the axis of the socket, calculated from formula (II) above, of −2°. FIG. 14 is an enlarged view of Section 90 in FIG. 13 showing the chamfered threads of one of the electrode sockets in detail.

EXAMPLE

A-Standard Joint

A 3⅝ inch diameter × 5½ inch standard double tapered nipple having a taper of approximately 9° in relation to the axis thereof was utilized to connect two 6 inch diameter graphite electrode sections having correspondingly tapered threaded sockets in their butt faces, utilizing 100 ft.-lbs. torque. The modulus of rupture (MOR), which is the amount of pressure required to cause failure of the electrode joint, and is a value well recognized in the art as useful in determining electrode joint strength, was then measured for this joint essentially according to the procedure and apparatus outlined in the American Society for Testing and Materials (ASTM) Method C651-70, "Flexural Strength of Manufactured Carbon and Graphite Articles Using Four-Point Loading at Room Temperature," the measuring instrument being an Instron ® Universal Testing Apparatus-Model TT-K.

B-Joints of the Invention

Three nipples essentially identical to the nipple used in experiment A were each placed in a Clausing 12 inch 5900 series lathe and centered, and the lathe was adjusted to progressively chamfer the ends of the nipples at angles of 15°, 17°, and 20° to the axis of the nipples respectively until the first two threads at the end of each nipple were affected. Each of the nipples was then reversed on the lathe and the identical chamfering process was repeated for the opposite ends thereof. Several nipples for each chamfer angle were prepared by this method. It can be seen that all these angles of chamfering lie within the maximum value limited by formula (I), and the preferred angle of 17° may be determined using formula (III).

Each chamfered nipple was then utilized to connect two 6 inch diameter electrode sections essentially identical to the sections used in experiment A, using the same torque. The modulus of rupture (MOR) was determined for each of these joints according to the standard ASTM procedure.

Due to the dependence of the joint MOR on the strength of the electrode sections or nipple stock used to form the assembly, joint strength is conventionally expressed in the art as a percent of the MOR of the component where failure (breakage) is observed to occur (i.e., socket or nipple failure). The formula for calculating this value is:

Joint strength as % of Component MOR =

$$\frac{MOR \text{ (joint at failure)} \times 100}{MOR \text{ (component that failed)}}.$$

This expression essentially cancels the varied strengths of the electrode or nipple stock so that a direct comparison of joint strengths may be determined. The following table summarizes the results of the experiments discussed above.

| JOINT STRENGTH AS A FUNCTION OF NIPPLE CHAMFER | | | |
|---|---|---|---|
| Chamfer Angle of Nipple Threads | Average Joint MOR, psi | Average Component MOR, psi | Average Joint Strength As % of Component MOR* |
| No chamfer | 730 | 1480 | 49.2 |
| 15°−2° threads | 690 | 1130 | 61.1 |
| 17°−2° threads | 830 | 1260 | 65.7 |
| 20°−2° threads | 870 | 1450 | 60.4 |

*The values given in this column may not be exact calculations from the other listed data, as all figures are average values for several trials.

As can be seen from the experimental data, a literal increase of 11 to 16.5% in joint strength, which is an improvement over a conventional joint of 23–33%, is provided by chamfering a nipple according to the invention.

While the invention has been described in detail and with reference to the drawings and specific embodiments thereof, it will be apparent to one skilled in the art that various changes and modifications can be made therein without departing from the scope and spirit thereof, and, therefore, the invention is not intended to be limited except as indicated in the appended claims.

I claim:

1. In a carbon electrode joint comprising two coaxially aligned carbon electrode sections, each said electrode section having a threaded socket in its butt face, and a correspondingly threaded nipple joining said electrode sections in abutting relationship, the improvement which comprises having the first few threads of each end of said nipple chamfered at an angle to the axis of said nipple of no more than the value of $_{max}C_n$ calculated from the formula $$_{max}C_n = \phi + 11°,$$

where $\phi$ = the angle of taper of the nipple in relation to the axis thereof.

2. An electrode joint according to claim 1, wherein the threaded sockets of the electrode sections are tapered and wherein the portions of the nipple threaded into said sockets are correspondingly tapered.

3. In a carbon electrode joint comprising two coaxially aligned carbon electrode sections, each said electrode section having a tapered threaded socket in its butt face, and a correspondingly tapered threaded nipple joining said electrode sections in abutting relationship, the improvement which comprises having the first two threads of each end of said nipple chamfered at an angle to the axis of said nipple the value of $_{opt}C_n$ calculated from the formula $$_{opt}C_n = \phi + 8°$$

where $\phi$ = the angle of taper of the nipple in relation to the axis thereof.

4. A threaded nipple for joining the abutting ends of correspondingly threaded carbon electrode sections, said nipple having the first few threads of each end thereof chamfered at an angle to the axis of said nipple of no more than the value of $_{max}C_n$ calculated from the formula $$_{max}C_n = \phi + 11°,$$

where $\phi$ = the angle of taper of the nipple in relation to the axis thereof.

5. In a carbon electrode joint comprising two coaxially aligned carbon electrode sections, each said electrode section having a threaded socket in its butt face, and a correspondingly threaded nipple joining said electrode sections in abutting relationship, the improvement which comprises having the first few bottom threads of each said socket chamfered at an angle to the axis of said socket of no more than the value of $_{max}C_s$ calculated from the formula $$_{max}C_s = \theta - 11°,$$

where $\theta$ = the angle of taper of the socket in relation to the axis thereof.

6. An electrode joint according to claim 5, wherein the sockets of the electrode sections are tapered and wherein the portions of the nipple threaded into said sockets are correspondingly tapered.

7. In a carbon electrode joint comprising two coaxially aligned carbon electrode sections, each said electrode section having a tapered threaded socket in its butt face, and a correspondingly tapered threaded nipple joining said electrode sections in abutting relationship, the improvement which comprises having the first two bottom threads of each said socket chamfered at an angle to the axis of said socket of no more than the value of $_{max}C_s$ calculated from the formula $$_{max}C_s = \theta - 11°,$$

where $\theta$ = the angle of taper of the socket in relation to the axis thereof.

8. In a male-female carbon electrode joint comprising first and second coaxially aligned carbon electrode sections, each said electrode section having a threaded nipple provided at one end thereof and a correspondingly threaded socket provided in the other end thereof, the nipple of the first electrode section being fitted into the socket of the second electrode section, the improvement which comprises having the first few threads of the end of the nipple of the first electrode section chamfered at an angle to the axis of said nipple of no more than the value of $_{max}C_n$ calculated from the formula $$_{max}C_n = \phi + 11°,$$

where $\phi$ = the angle of taper of the nipple in relation to the axis thereof.

9. In a male-female carbon electrode joint comprising first and second coaxially aligned carbon electrode sections, each said electrode section having a threaded nipple provided at one end thereof and a correspondingly threaded socket provided in the other end thereof, the nipple of the first electrode section being fitted into the socket of the second electrode section, the improvement which comprises having the first few threads at the bottom of the socket of the second electrode section chamfered at an angle to the axis of said socket of no more than the value of $_{max}C_s$ calculated from the formula $$_{max}C_s = \phi - 11°,$$

where $\theta$ = the angle of taper of the socket in relation to the axis thereof.

* * * * *